United States Patent

McKinstry

[15] 3,659,551

[45] May 2, 1972

[54] GLASS TREATING TUNNEL

[72] Inventor: Richard G. McKinstry, Lancaster, Ohio

[73] Assignee: Anchor Hocking Corporation, Lancaster, Ohio

[22] Filed: Aug. 10, 1970

[21] Appl. No.: 62,489

[52] U.S. Cl. .................................. 118/48, 34/242, 98/36
[51] Int. Cl. .................................................. C23c 11/00
[58] Field of Search .............................. 118/47–50.1;
98/36; 34/242

[56] References Cited

UNITED STATES PATENTS

| | | | |
|---|---|---|---|
| 2,856,312 | 10/1958 | Nowak et al. | 118/48 X |
| 2,986,115 | 5/1961 | Toulmin, Jr. | 118/48 |
| 3,086,882 | 4/1963 | Smith, Jr. et al. | 118/49.1 X |
| 3,108,022 | 10/1963 | Church | 118/404 X |
| 3,183,888 | 5/1965 | Blackman | 118/49.5 |
| 3,314,393 | 4/1967 | Haneta | 118/48 |
| 3,353,514 | 11/1967 | Lyle | 118/49 |
| 3,437,734 | 4/1969 | Roman et al. | 118/49.5 X |
| 3,452,711 | 7/1969 | Reeves et al. | 118/49.5 |
| 3,461,268 | 8/1969 | Wove | 118/49.5 X |
| 3,473,510 | 10/1969 | Shenget al. | 118/49.5 |

FOREIGN PATENTS OR APPLICATIONS 1,048,005 12/1958 Germany ................................ 98/36

*Primary Examiner*—Morris Kaplan
*Attorney*—Wood, Herron & Evans

[57] ABSTRACT

A glass treating tunnel or furnace particularly adapted to expose glass articles to treating vapors. The tunnel comprises, in order from inlet end to outlet end, an inlet air door, an inlet dead zone, a treating chamber, an outlet dead zone, and an outlet air door. Preferably, an open mesh belt traverses the glass treating tunnel from one end to the other, the belt being adapted to carry thereon the glass articles to be treated.

The inlet and outlet dead zones are not provided with atmosphere circulation means, and the atmosphere within them is quiescent. The treating chamber is provided with apparatus for supplying the vapor with which the glass articles are to be treated, and apparatus for circulating the vapor containing atmosphere within the treating chamber. Heating elements control the temperature of each air door's airstream of the circulating atmosphere to a desired level. This structural combination unexpectedly promotes maintenance of the treating vapors within the treating chamber.

Vapor drift may tend to occur toward one end or the other of the treating chamber through one or the other of the inlet and outlet air doors, the direction of the drift being mainly dependent on atmospheric conditions outside the glass treating tunnel. Drift controlling means are provided in the inlet and/or outlet dead zones, which counteract such vapor drift, thereby promoting maintenance of treating vapors within the treating chamber.

7 Claims, 10 Drawing Figures

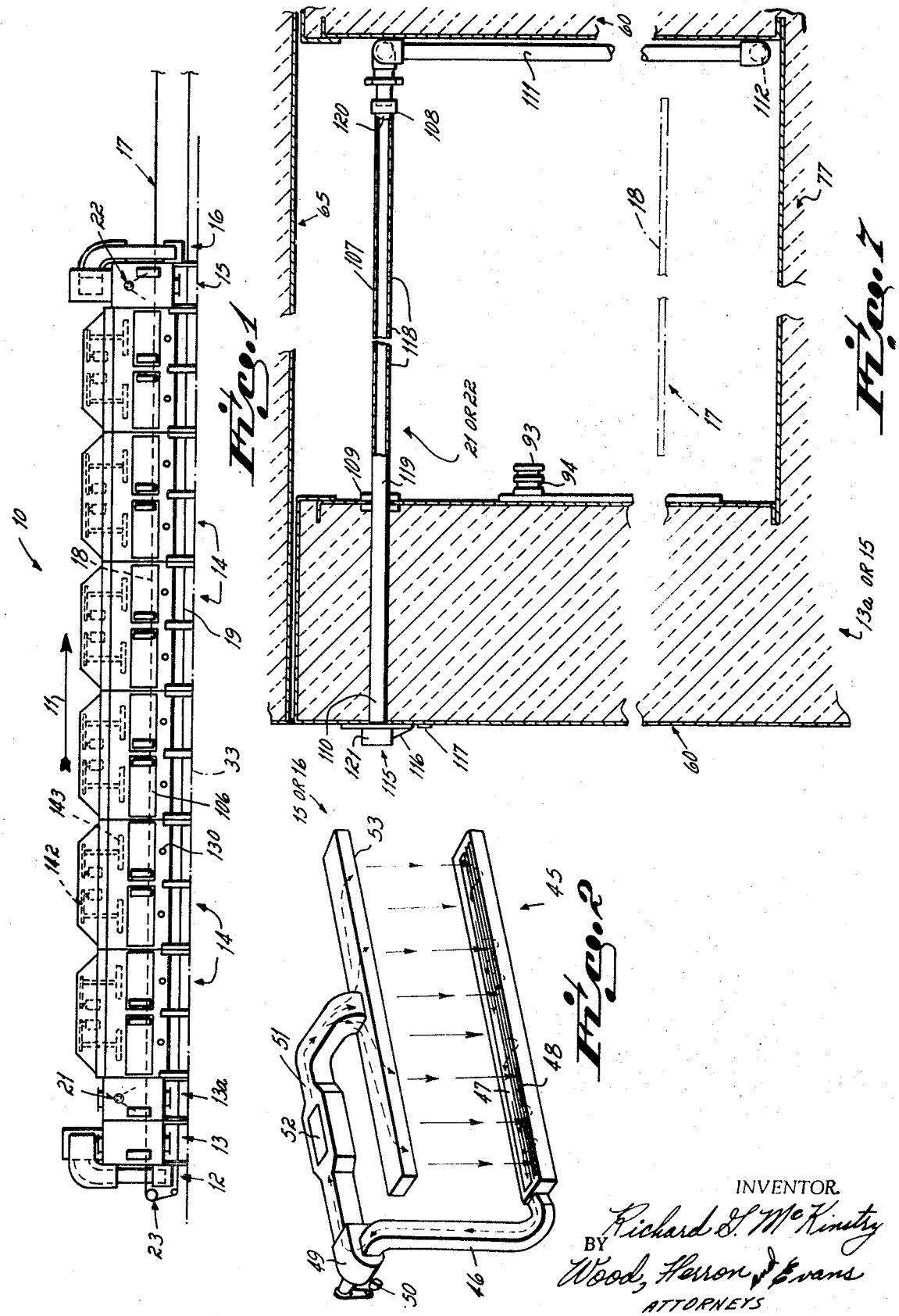

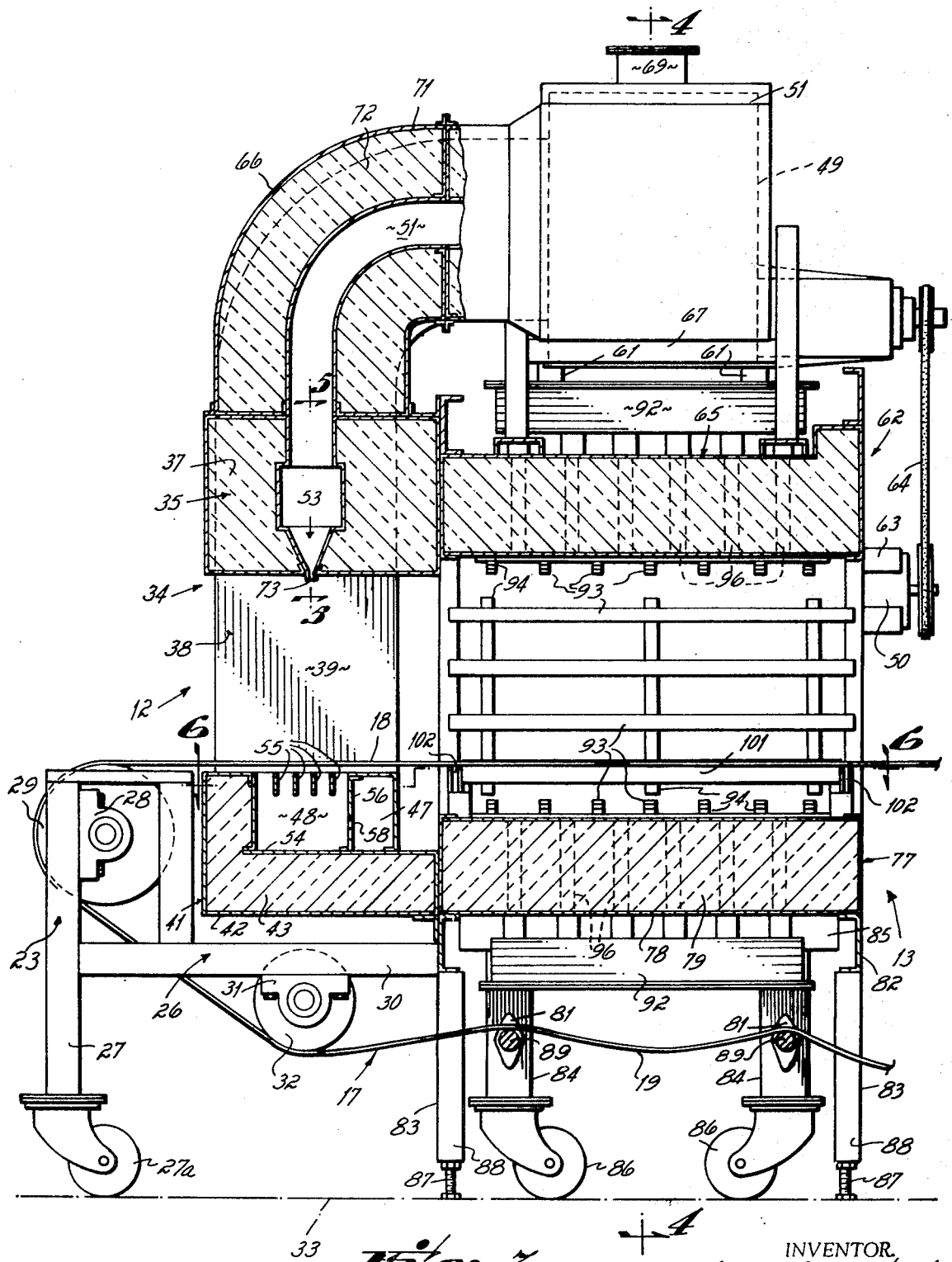

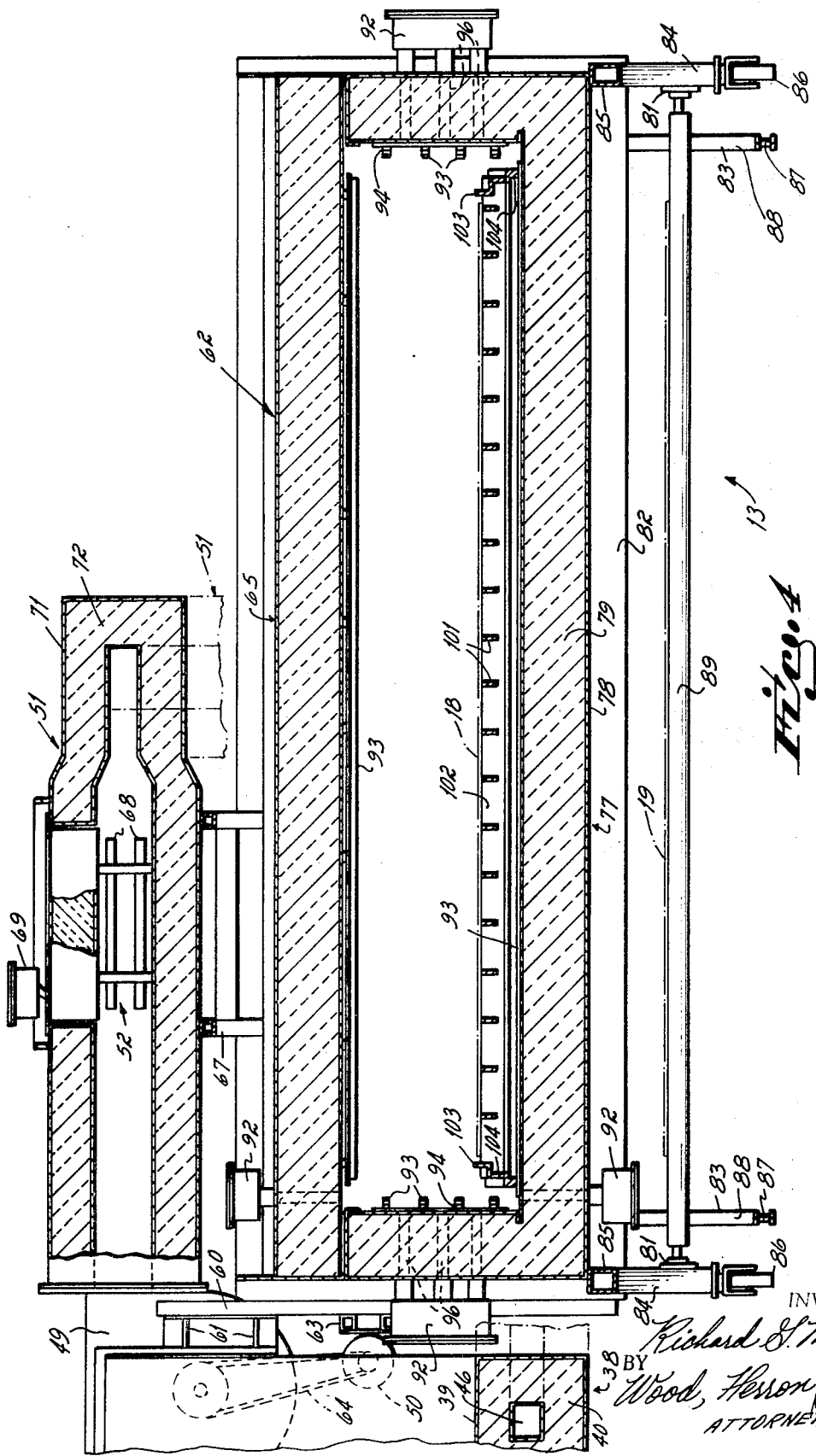

Patented May 2, 1972
3,659,551
7 Sheets-Sheet 4
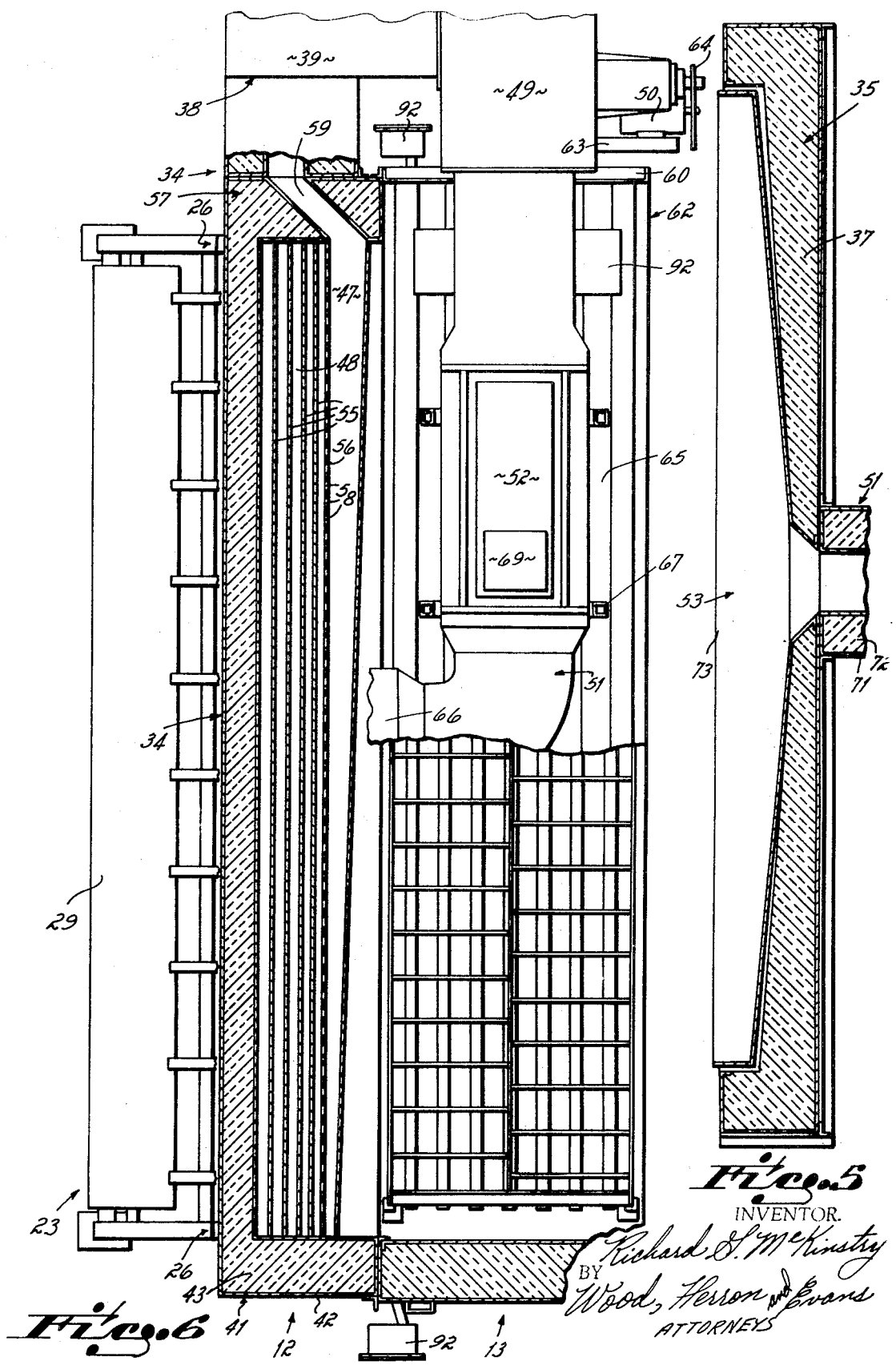

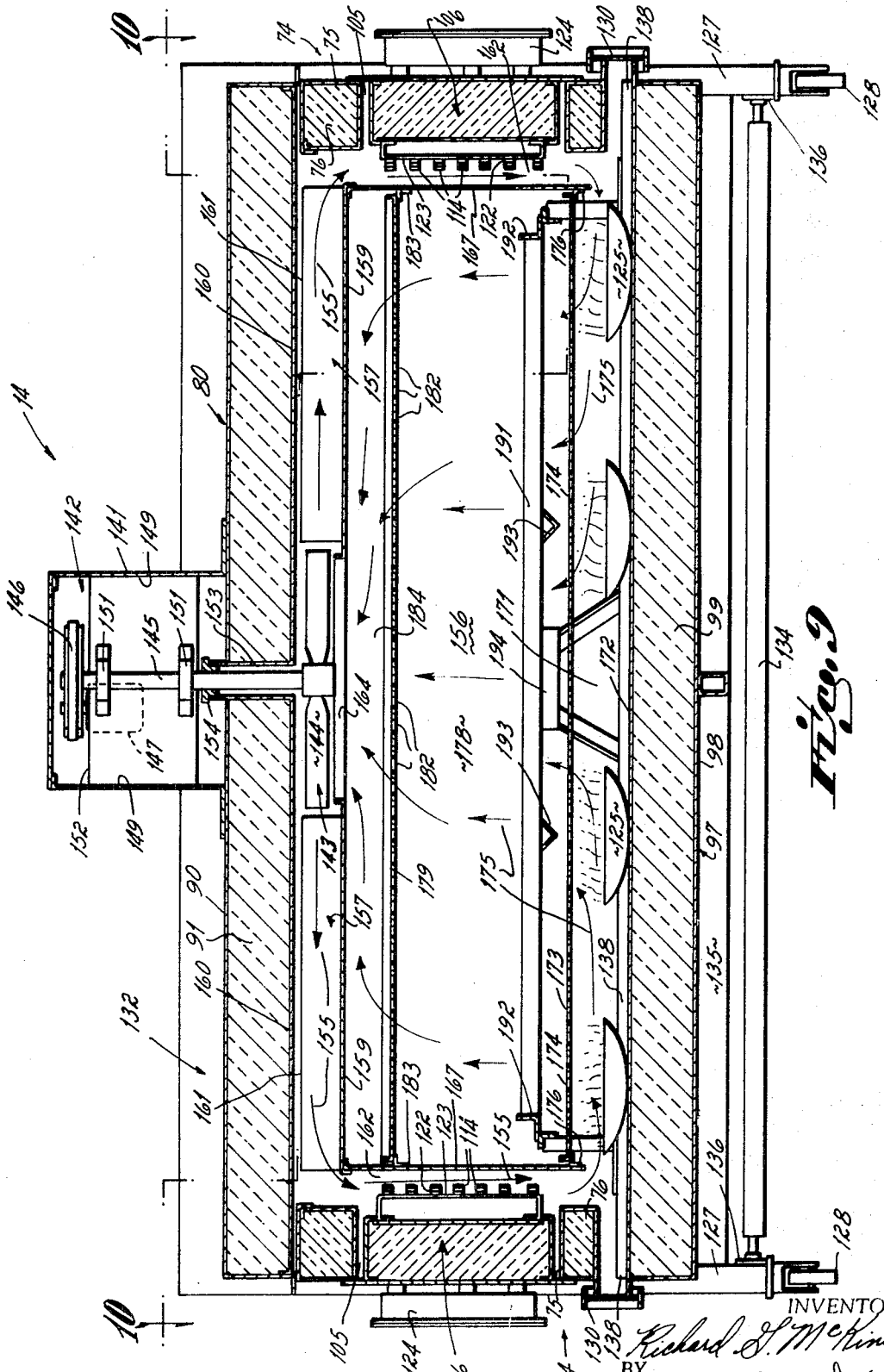

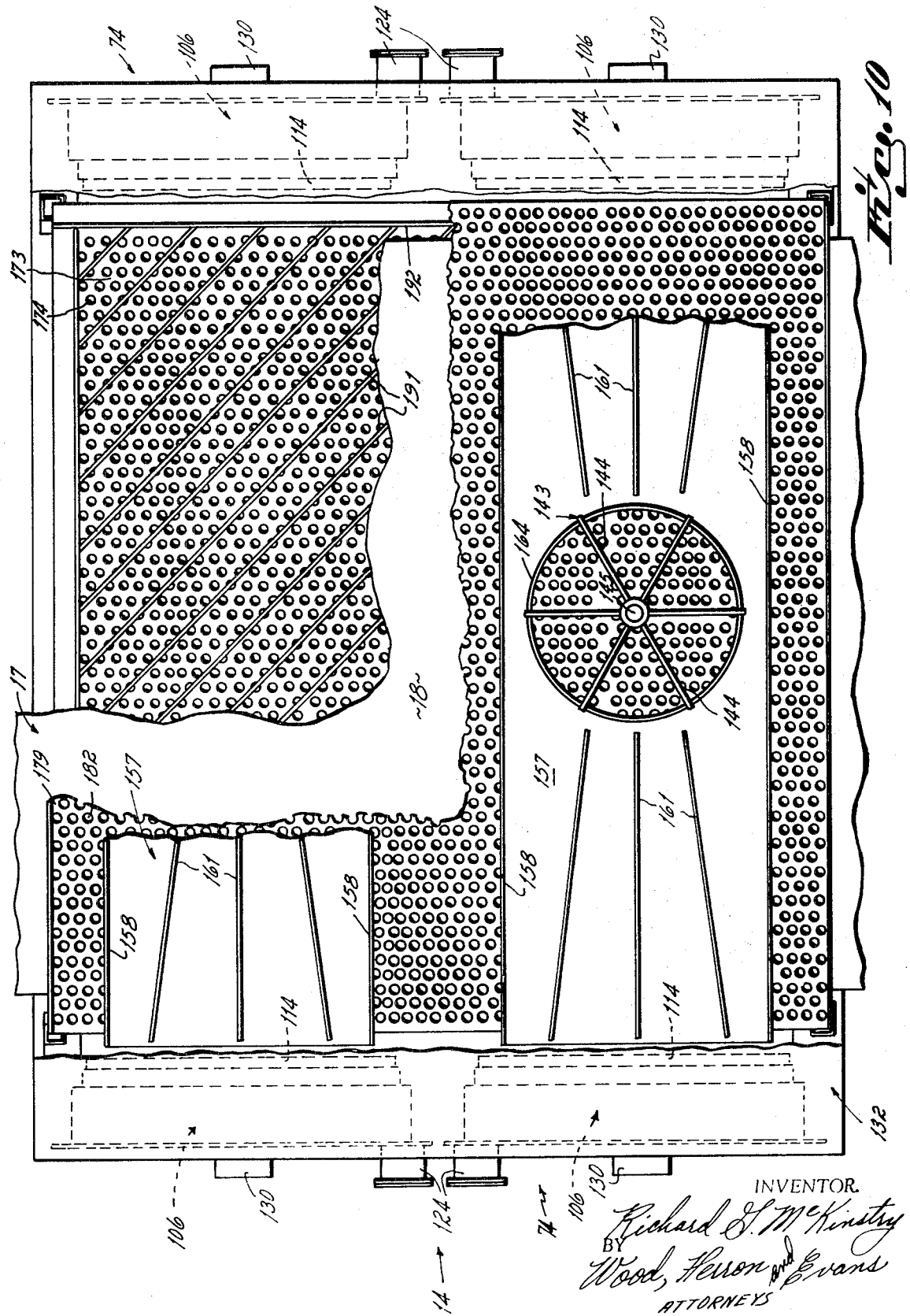

GLASS TREATING TUNNEL

This invention relates to glass treating equipment and, more particularly, relates to a novel glass treating tunnel by which glass articles can be exposed to treating vapors without loss of those vapors to the environment within which the tunnel is located.

Shonebarger U.S. Pat. No. 3,489,546, issued Jan. 13, 1970, discloses one type of glass treatment by vapor, with which the present tunnel is advantageous. In that method, glass articles are strengthened by establishing a surface zone on the article which is in substantial compression, so as to increase the maximum tensile strength of the article.

As disclosed there in greater detail, the method includes the step of contacting at least a portion of the surface of the glass article with a material reactive therewith consisting of a cuprous halogen compound. The cuprous halogen compound, preferably cuprous chloride, is preferably in the vapor phase at the time of its contact with the glass article.

The article is heated while in contact with the cuprous halogen vapor to a temperature which is above the annealing point of the glass but below the temperature at which the article deforms undesirably. The heating is carried out under conditions which are non-reducing for copper ions, and is continued for a period of time sufficient to enrich a surface layer of the formed article with copper ions from the cuprous halogen compound. The copper ions migrate from the surface of the glass article into a zone or surface layer underlying the surface in partial exchange for the alkali metal ions of the glass. Subsequently, the formed article is cooled below its annealing point in a non-reducing atmosphere. This causes the copper ion enriched surface layer of the glass to be placed in compression because of the differences in expansion coefficients of the copper ion enriched surface layer as compared to the non-enriched or original glass. Thus, the tensile strength of the glass article is substantially increased.

Cuprous halogen vapors such as used in the Shonebarger method can act as contaminating agents if they escape from the treating zone. It is important, therefore, to maintain the treating vapors within a closed environment to prevent their escape and loss.

Another type of glass treating process wherein confinement and isolation of glass furnace atmosphere is required is the $SO_2$ alkali extraction process. In that process, glass articles are exposed to a heated atmosphere containing oxides of sulphur as the operative vapor, which vapors are poisonous and corrosive.

Broadly speaking, the glass treating tunnel of this invention is particularly adapted for use with glass treating processes wherein a vapor is contacted with a glass surface at elevated temperature conditions, and where vapor escape or loss is dangerous, costly or otherwise undesirable. The tunnel is particularly adapted to confine and maintain treating vapors or gases within a treating chamber, and to substantially prevent the exhaust of those vapors or gases from the chamber into the surrounding atmosphere, while permitting a continuous, uninterupted throughput of glass articles into and out of the treating chamber.

Basically, the glass treating tunnel of this invention comprises, in order from inlet end to outlet end, an inlet air door, an inlet dead zone, a treating chamber, an outlet dead zone, and an outlet air door. Preferably, an open mesh belt is positioned to traverse the glass treating tunnel from one end to the other, the belt being adapted to carry thereon the glass articles to be treated.

The inlet and outlet dead zones are not provided with atmosphere recirculation equipment, and their purpose is to provide quiescent or buffer zones between the air doors and the treating chamber. The treating chamber is provided with apparatus for supplying the vapor with which the glass articles are to be treated, and apparatus for circulating the essentially vaporous or gaseous atmosphere within the treating chamber. Further, the air doors, inlet and outlet dead zones, and treating chamber are all provided with heating elements by which the temperature of each air door's air blast, of the circulating vapor or gas atmosphere, and of the dead zone space can be controlled to a desired level. This structural combination unexpectedly promotes maintenance of the treating vapors within the treating chamber.

The inlet and outlet dead zones are required in the glass treating tunnel of this invention. They are essential to prevent loss of vapor from undesirable mixing of the treating chamber's vapors with the airstream in the air door and consequent loss to the outside. It has been unexpectedly found that by providing a dead zone between the air doors and the treating chamber, and particularly where the temperature of that dead zone is substantially the same as the temperature of the treating chamber, that the vapors or gases are very largely retained within the treating chamber as they are circulated therein.

A drift controller is preferably positioned in each of the inlet and outlet dead zones, although a drift controller in only one of the dead zones is quite often sufficient. The drift controller functions to counteract treating vapor or gas drift, thereby further promoting maintenance of the treating vapors within the treating chamber and reducing loss of treating vapors or gases from the tunnel. During operation, vapor drift may tend to occur toward one end or the other of the treating chamber into one or the other of the inlet and outlet dead zones, the direction of the drift being mainly dependent on atmospheric conditions outside the glass treating tunnel. Even when the glass treating tunnel is in an environment that is substantially draft free, it has been observed that for unknown reasons vapor or gas drift may occur through the glass treating tunnel at a very low volume level; they may be from the inlet end toward the outlet end at one point in time, and from the outlet end toward the inlet end at a subsequent point in time, with no apparent reason for the switch. It is thought that simply the opening of a door to the room within which the glass treating tunnel is located may be sufficient to change the vapor or gas drift from one end of the tunnel to the other. In any event, the drift controllers are mainly provided to counteract this kind of treating vapor or gas drift through the tunnel.

Other objectives and advantages of this invention will be more apparent from the following detailed description taken in conjunction with the drawings in which:

FIG. 1 is a side elevational view illustrating a glass treating tunnel in accordance with the principles of this invention;

FIG. 2 is a diagrammatic perspective view illustrating an air door system used in connection with inlet and outlet air doors;

FIG. 3 is a vertical longitudinal cross-sectional view taken through an inlet air door module and an inlet dead zone module;

FIG. 4 is a vertical transverse cross-sectional view taken along lines 4—4 of FIG. 3;

FIG. 5 is a vertical transverse cross-sectional view taken along lines 5—5 of FIG. 3;

FIG. 6 is a horizontal transverse cross-sectional view taken along lines 6—6 of FIG. 3;

FIG. 7 is a vertical transverse cross-sectional view, partially broken away, illustrating an air drift controller used in inlet and outlet dead zones;

FIG. 9 is a vertical transverse cross-sectional view taken along lines 9—9 of FIG. 8; and FIG. 10 is a horizontal longitudinal cross-sectional view taken along lines 10—10 of FIG. 9.

Figure 8:
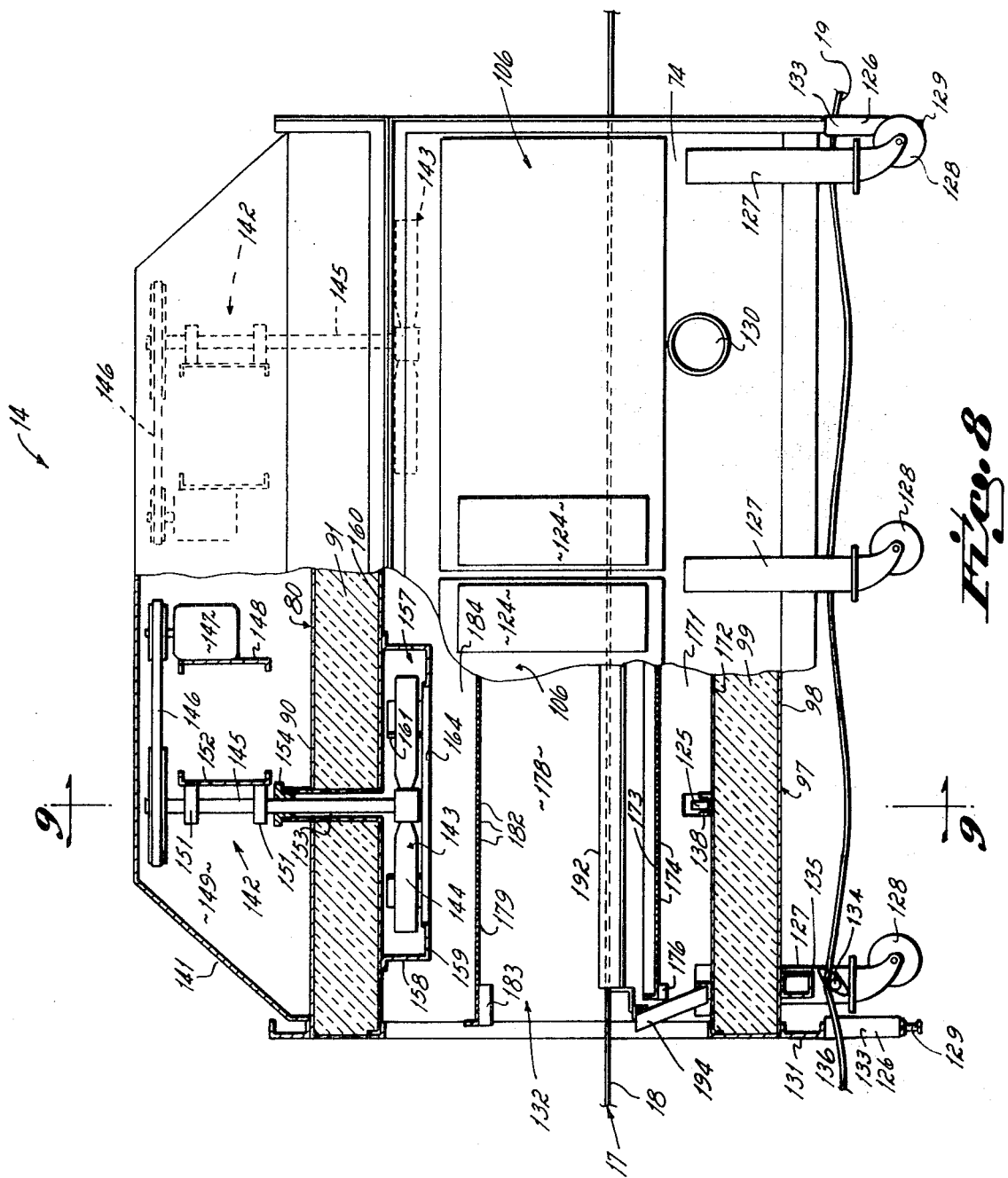
FIG. 8 is a partially broken away side elevational view of a treating chamber module.

As illustrated in FIG. 1, the glass treating tunnel 10 of this invention, in order and in the machine direction of the tunnel as illustrated by arrow 11 (from left to right in FIG. 1), is comprised of an inlet air door unit 12, two dead zone units 13, 13a, six treating chamber units 14, an outlet dead zone unit 15, and an outlet air door unit !6. An endless belt type open mesh conveyor 17 having an upper run 18 and a lower run 19 is positioned so that the upper run extends through the tunnel. This tunnel 10 apparatus is particularly adapted for use in carrying out the method of Shonebarger U.S. Pat. No. 3,489,546 where cuprous chloride vapor is the preferred vapor for treating glass articles. In FIG. 1 the endless belt 17 is illustrated as continuing on downstream from the glass treating tunnel 10 and no downstream end is shown; the upstream end of the belt is shown to commence at the upstream end of the glass treating tunnel. Further, it will be noted that the upper run 18 of the belt 17 passes through the tunnel 10, but the lower run 19 of the belt returns beneath the tunnel. A suitable drive mechanism, not shown, is located downstream from the tunnel exit.

The air doors 12, 16, dead zones 13, 13a, 15 and treating chamber 14 are provided in the form of modular units. This modular construction permits relatively easy assembly or setup of the glass treating tunnel at the operating location in light of the fact that its length may be quite extended, for example, on the order of 100 feet from end to end. Such an extended length tunnel 10 is needed because of the residence time requirements of the glass articles in the cuprous chloride treating vapor when this tunnel is used to carry out the method of U.S. Pat. No. 3,489,546. Further, this modular construction is useful in building the tunnel as a smaller work area may be used. Other advantages of the modular construction are that it is easier to transport the glass treating tunnel from manufacturing site to use site, it is easier to service the glass treating tunnel, and the length of the glass treating tunnel may be increased or decreased as required depending on the vapor or gas treatment to which the glass articles are exposed inside the tunnel.

The inlet air door 12 and one dead zone modular unit 13 at the upstream end of the glass treating tunnel 10 are illustrated in detail in FIGS. 2–6. It will be noted that there are two dead zone units 13, 13a at the upstream end of the tunnel. These units are identical except that unit 13 has a portion of the apparatus associated with air door 12 mounted on the top of it, and unit 13a has a drift controller 21 (unit 13 has no drift controller). Further, it will be noted that inlet air door 12 and unit dead zone 13 are basically the same as outlet air door 16 and outlet dead zone 15 except that outlet dead zone 15 has a drift controller 22, and except for the mountings 23 provided for the conveyor belt 17 on the inlet air door unit 12. Therefore, a description of inlet air door 12 and inlet dead zone 13 will suffice as to outlet air door 16 and outlet dead zone 15, and a description of inlet dead zone 13 will suffice as to inlet dead zone 13a except as to the drift controller 21.

FIG. 3 illustrates a longitudinal cross-sectional view taken vertically through the inlet air door modular unit 12 and the inlet dead zone modular unit 13, the two being illustrated in combination because of the structural relationship of the apparatus. The inlet air door modular unit 12 is comprised of a frame 26 having front legs 27 on which are mounted wheels 27a. Each front leg 27 mounts a bearing block 28 toward the top, and those bearing blocks 28 carry an end roller 29 about which the endless belt 17 is passed. Side struts 30 on each side of the frame mount bearing blocks 31, and those bearing blocks carry idler roller 32. The idler roller 32 is positioned beneath the tunnel 10, the tunnel being raised off ground 33 by legs on each of the units 12–16, to aid in guiding the return run 19 of the belt 17 beneath and outside of the tunnel structure.

The air door housing 34 includes a top panel 35 filled with insulation 37, and a side panel 38 having a casing 39 also filled with insulation 40. The bottom panel 41 of the air door housing 34 is L-shaped in vertical cross-section, see FIG. 3, the casing 42 of that panel 41 also being filled with insulation 43.

The air door circulation system 45 is particularly illustrated in FIG. 2. The circulation system 45 includes a vertical return-air duct 46 connected with a horizontal return-air duct 47, the horizontal duct 47 being connected with air pickup chamber 48 which extends across the width of the tunnel 10 at the bottom thereof. Vertical return-air duct 46 is connected with a blower 49 driven by motor 50. The blower 49 is connected with a feed-air duct 51 within which is positioned a heater 52 to heat the air delivered by the blower. The feed-air duct 51 is connected with a discharge plenum or nozzle 53 which extends across the width of the tunnel 10 at the top thereof. Air flow through the system is indicated by arrows in FIG. 2.

As is illustrated in FIGS. 3 and 4, the air pickup chamber 48 is located in the seat 54 of L-shaped bottom panel 41, the chamber 48 being open to the floor or inside of the tunnel through louvers 55 adjacent the top thereof positioned perpendicular to the axis of the tunnel 10. The air pickup chamber 48 is separated from the horizontal return-air duct 47 by a common wall 56, the horizontal return-air duct 47 being disposed parallel to the pickup chamber 48 across the width of the tunnel 10, see FIGS. 3 and 6. The air forced into the air pickup chamber 48 is vented into the horizontal return-air duct 47 through holes 58 provided in the common wall 56, see FIG. 6. The horizontal return-air duct 47 is connected with the vertical return-air duct 46 in side panel 38 by a passage 59 through an end panel 57 of the air door housing 34, see FIG. 6. The duct 46 leads up the interior of side panel 38 to the blower 49 and is enclosed by the casing 39 which is filled with the insulation 40, see FIGS. 4 and 6. The blower 49 is mounted on struts 61 fixed to the side panel 60 of the housing 62 of dead zone 13. The blower motor 50 is also fixed to the side panel 60 of dead zone housing 62 by struts 63, and the motor drives the blower 49 through belt 64.

Feed-air duct 51 extends from the blower 49 across the top panel 65 of dead zone housing 62 to approximately the center thereof (see FIG. 4), whereat it curves down as at 66 (FIG. 3) to connect with nozzle 53. Heater 52 is located intermediate the feed-air duct 51 length, and struts 67 support the duct 51 and heater 52 above the top panel 65 of the dead zone housing 62. The heater 52 is an electrical resistance type heater having resistance strips 68 within the air passage through the heater. The heater is provided with a conduit box 69 on the top thereof for making the required electrical connections. The heater 52 and feed-air duct 51 are enclosed by casing 71 which is filled with insulation 72. By heating the air circulated through the air door circulation system 45, cracking of the glass articles as they pass through the air door (when they are at elevated temperatures) is avoided.

The heated air is directed through the feed-air duct 51 to nozzle 53 where it is discharged as an air curtain, see FIGS. 2, 3 and 5. The nozzle 53 is located in the top panel 35 of the air door housing 34 and extends through that panel 35 across the width of the tunnel 10, see FIG. 5, thereby effectively insulating the nozzle. The nozzle 53 is provided with a narrow orifice 73 at its outlet end to provide a relatively low velocity air curtain. Thus, the air door system 45 provides a blower 49 for circulating the air and a heater 52 for heating the air, both cooperating to aid in maintaining the treating vapors within the treating chambers 14. The air curtain, of course, functions mechanically to aid in isolating the treating chambers 14 from the outside environment, and by heating the recirculating air with heater 52 a temperature profile can be maintained that aids in prevention of convective currents within the treating chambers 14 toward one end of the tunnel 10 or the other.

I have found that the velocity of the air current in the air door has a definite effect on the amount of mixing (and, hence, vapor loss) that occurs. It might be expected that high velocity of the airstream in the door would be most effective to minimize vapor loss, but in fact I have found that speeds of 100–300 feet per second are much preferable to the speed of 1000 and more feet per second used in air doors of, for example, commercial department stores. At such low air velocities, use of a dead zone has been found to contribute especially to isolation and confinement of the vapor. Air velocities above about 300 feet per second cause turbulence to be created in the dead zones, 13, 13a, 15 which tends to pull the treating vapors into the air door flow. This, in turn, causes loss of the treating vapors through the air doors 12, 16 to the outside environment. Air velocities below about 100 feet per second are just not sufficient to establish the desired air door effect.

The first 13 and second 13a inlet dead zone modular units, as mentioned, are identical one with the other except that the second unit 13a does not have the blower 49 and heater 52 required for the air door module mounted on the top thereof and the first unit 13 does not have a drift control 21. Two dead zone units 13 are positioned at the inlet end of the tunnel 10, as opposed to only one unit 15 at the outlet end, because it has been found that as a general rule a longer length dead zone is required to cooperate with incoming glass articles than is required with the outgoing glass articles in order to maintain the treating vapors within the treating chambers 14. The length of the combined inlet dead zones 13, 13a is such that turbulence from the treating chamber 14 does not reach air doors 12 or 15. Dead zones 13, 13a should be about 6 feet long at the entrance end and dead zone 15 should be at least about 3 feet long at the exit end when the overall tunnel length is about 100 feet and when the tunnel is used to carry out the process described in Shonebarger U.S. Pat. No. 3,489,546.

Each dead zone modular unit 13, 13a, 15, as illustrated in FIGS. 3, 4 and 6, is comprised of a top panel 65, a bottom panel 77 and two side panels 60, all of which comprise casings 78 which are completely filled with insulation 79. Heaters comprised of electrical resistance strips 93 are mounted on appropriate insulators 94 carried on inside surfaces of the top 65, bottom 77 and side 60 panels to heat the inside of the dead zones 13, 13a and 15. The four grid-like heaters, made up of the resistance strips 93, on each side of the side 60, top 65 and bottom 77 panels are interconnected with their own separate conduit box 92 located on the outside of each panel. The electrical resistance bars 93 are interconnected with their conduit boxes 92 by leads (not shown) which extend through channels 96 provided in the panels. Precautions are taken to insure that the furnace atmosphere does not enter any of the conduit boxes, e.g., the conduit leading from the furnace to the conduit box is sealed. Also, the conduit boxes are preferably sealed from the outside atmosphere.

Belt rails 101 mounted to cross bars 102 are positioned above the resistance bars 93 associated with the bottom panel 77 to support the upper run 18 of the belt 17 as it moves through the dead zone, see FIGS. 4 and 6. Cross bars 102 are mounted to side bars 103, the side bars 103 being mounted to the top surface of bottom panel 77 through supports 104, thereby fixing the belt rail 101 grid above the floor of the dead zone modular units 13, 13a and 15.

The dead zone 13 is mounted on a pair of transverse channels 82 each of which is provided, toward the four corners of the unit, with a jack type leg 83. Wheel legs 84 depend from cross braces 85, each of the legs 84 being provided with a wheel 86 at its bottom end. When the adjustable ends 87 of the jack legs 83 are retracted into the tubular housing 88, the modular dead zone unit 13 rests on the wheels 86 and may be moved easily about the plant. Between opposite pairs of wheel legs 84 there is mounted an idler bar 89 which is carried at each end in a bearing block 81 mounted to the appropriate leg. These idler bars 89 cooperate with the idler rolls 32 at each end of the closed loop conveyor belt 17 to maintain the belt's lower run 19 in a draper or untensioned attitude so that the belt does not sag on the lower run; such sag in the belt could cause deformation or stretch therein if the belt were not supported on its lower run 19 by idler bars 89.

The inlet dead zone modular unit 13a and outlet dead zone modular unit 15 each carry a drift control mechanism 21, the drift control mechanism being the same in each. The drift control 21, although shown in the dead zones 13a, 15, may also be positioned in the treating chamber 14 if desired. The drift control 21, as used in the glass treating tunnel described herein, functions mainly to control or prevent drift of treating vapors from the treating chamber 14 to the outside atmosphere. But the drift control 21 is also quite useful with other open ended treating tunnel structures which have a continuous throughput of material to be treated. For example, the drift control 21 of this invention would be also useful with a lehr where there are no treating vapors to minimize atmospheric drift through the lehr, i.e., to maintain the heat within the treating chamber or environment.

The drift control mechanism 21 is illustrated particularly in FIG. 7. The drift control 21 comprises a pipe 107 which extends transversely across the width of the tunnel 10 from one side panel 60 to the other, the pipe 107 being positioned perpendicular to the axis of the tunnel. The pipe 107 is preferably located just beneath the top panel 65. The pipe 107 is carried in bearings 108, 109, one end 110 of the pipe extending through a side panel 60 to the outside of that panel and the other end of the pipe being coupled through bearing 108 with suitable supply piping 111 connected to a compressed air source, not shown, at end 112. A series of holes 118 are drilled in the pipe 107 from one side only, thereby providing rotatable nozzles which are able to provide jets of air directed generally along the length or axis of the tunnel and which are rotatable into any angular direction relative to the axis of the tunnel 10. Preferably, the nozzles 118 are all formed in a line on the pipe 107 that is parallel to the axis of the pipe. That end 110 of the pipe which extends through to the outside wall of the side panel 60 is provided with an angular indicator 115 having a pointer 116 that cooperates with a scale 117. The pointer 116 of the angular indicator 115 is aligned with the line of holes 118 in the pipe and is fixed relative thereto. Thus, the angular position of pointer 116 indicates the angular position of the line of holes 118 in pipe 107. Therefore, by rotating the pipe 107 by grasping knob 121 of the angular indicator 115, and by noting the angular position of the pointer 116 on the angular indicator, an operator can determine whether the line of holes 118 in the pipe are angulated toward the downstream end of the tunnel 10 or toward the upstream end of the tunnel and an operator can determine the degree of that angulation.

When the drift control 21 and treating tunnel 10 of this invention are used to practice the method of Shonebarger U.S. Pat. No. 3,489,546, the drift control air supply should be as dry as possible, e.g., $-100°$ F. dew point to prevent reaction with CuCl. It should also be clean and free of oil vapors, to prevent fouling of jet holes 118. Further, the piping 107, 111, 112 should be stainless steel to prevent corrosion. Also the air should be preheated by, for example, making supply piping 111 long enough to allow the tunnel 10 temperature to heat the air passing therethrough.

As explained in the introduction, there should be no vapor or gas drift through the glass treating tunnel 10 from one end to the other because the treating vapor or gas in the treating chambers 14 is completely circulated therein by apparatus described below and because of the air doors 12, 16 and dead zones 13, 13a and 15. Nonetheless, under practical operating conditions it has been found that some treating vapor or gas drift does occur. With the drift control mechanism 21 described above, an operator can counteract the drift through the tunnel 10. This is achieved under operating conditions simply by rotating the pipe 107 and adjusting the air pressure, so that the jets of compressed air exiting from the holes 118 therein are directed contra to the vapor drift noted through the tunnel 10 until an equilibrium condition is achieved where no drift occurs. The presence or absence of drift can be noted simply by observing whether or not any vapor is exiting through the air doors 12, 16 at either end of the tunnel 10. (A torch flame will burn green in the presence of escaping copper vapor when the tunnel 10 is used to practice the method of Shonebarger U.S. Pat. No. 3,489,546.)

Thus, the drift control mechanism 21 and 22 in the second inlet dead zone 13a and in the outlet dead zone 15 respectively are usually operated together to provide the desired resultant effect which assures that the treating vapors or gases within the treating chambers 14 are maintained therein and do not escape from the treating chambers 14 through the air doors 12, 16. There are times when one drift controller 21 (at the entrance end) will be sufficient. In this connection, it is preferable to space the drift control 21 from the front air door 12 by about 5 feet when a tunnel length of 100 feet is used. If closer, action of the drift control air across the air door 12 can interfere with the desired isolation of the treating vapors.

Further, the drift controllers 21 cooperate with the heaters associated with the dead zones 13, 13a, 15 and the air doors 12, 16 to aid in maintaining the treating vapors within the treating chambers 14. The heaters are adapted to create an environmental temperature within the dead zones and air doors such that convective air currents from the treating chambers 14 to the dead zones and, hence, through the air doors, are kept at a minimum and the drift controllers then counteract any other drift which occurs.

While operation of the air drift controllers 21, 22 may be manual based on visual observation of vapor drift through the tunnel 10 as described, it may also be automatic. Such can be achieved simply by placing a sensing element, not shown, in each of the inlet 13a and outlet 15 dead zones where the drift controllers 21, 22 are located. When the sensing element determines that there is an imbalance of treating vapors or gases in one dead zone as opposed to the other (for example, a higher concentration of CuCl at one end than the other), such then energizes a controller, not shown, which rotates the drift control pipe 107 (or increases drift control air velocity or volume) in one dead zone or the other as required to bring the sensing elements again in balance. Although particular structure and equipment is not illustrated and described for achieving this automatic operation of the drift controllers 21, it will be apparent to those skilled in the art that such can be achieved with equipment now known. The use of 1/32 inch diameter holes, drilled on 1¾ inch centers produce the best combination of jet strength at lowest air usage. At these conditions, very low air flows even at low pressures are surprisingly effective to neutralize large drift velocities in the tunnel. This can be seen from the following data.

| Tunnel Velocity to be neutralized | Pressure in Pipe 107 | Air Usage CFM/1/32 Diameter Hole | Range |
| --- | --- | --- | --- |
| 50 ft./min. | 1.27 p.s.i.g. | 0.16 | Normal |
| 90 ft./min. | 2.18 p.s.i.g. | 0.22 | Normal |
| 150 ft./min. | 5.0 p.s.i.g. | 0.43 | Normal |
| 500 ft./min. | 10.0 p.s.i.g. | 0.5 | |

The treating chamber modular units 14 are identical one with the other; one of these modular units is illustrated in FIGS. 8–10. The treating chamber zone modular unit 14 is provided with a bottom panel 97 having a casing 98 filled with insulation 99, side panels 74 each having a casing 75 filled with insulation 76, and a top panel 80 having a casing 90 filled with insulation 91, see FIGS. 8 and 9.

The inside walls of the side panels 74 have four openings 105 which receive and mount four electrical heaters 106 having resistance strips 114. These strips 114 are carried on insulators 122 mounted to brackets 123 extending from the interior of the heaters 106. The strips 114 are connected with conduit boxes 124 mounted on the outside walls of the heaters 106, see FIG. 9. The side wall of each chamber 14 is of a length sufficient that two separate resistance strip grids 114, i.e., two separate heaters, 106, each with its own conduit box 124 is required per side.

The chambers 14 are supported on four telescoping legs 126, one at each of the four corners thereof, which are mounted to cross channels 131 that extend across the width of the treating chamber housing 132; these telescoping legs are of the adjustable type as was described for the dead zone modular unit, see FIG. 8. Further, the outside wall of each side panel 74 mounts three legs 127 and each of these legs carrying a wheel 128 at the bottom end thereof; each pair of legs 127 is reinforced by cross channel 135, see FIG. 8. Thus, when the adjustable ends 129 of the telescoping legs 126 are retracted into the housings 133 therefor, the treating chamber modular unit 14 is readily movable from one position to another on wheels 128. As was the case with the dead zone modular units 13, 13a, 15, an idler bar 134 is positioned between each pair of wheel legs 127 across the width of the tunnel, the idler bars being carried in suitable bearing blocks 136 mounted to the inside of those legs. Thus, the lower run 19 of the conveyor belt 17 passes over the idler bars 89, 134 to maintain same in a draped relation as it is returned to the inlet end of the treating tunnel 10 beneath the tunnel. The belt 17 drive mechanism, not shown, is located under the exit end of the belt. It is provided with proper take-up devices, not shown, to prevent drapes between bars 89, 134 from touching the floor.

Two chutes 138 are spaced along the bottom panels 97 of the heating chamber housing 132, and these chutes extend transversely across the tunnel 10 in relation to the direction of conveyor belt 17 travel, see FIGS. 8 and 9. The chutes 138 are mounted to the floor of the tunnel 10, i.e., to the inside surface of the bottom panel 97. The chutes 138 extend through the side panels 74 and access thereto from the outside of the tunnel is provided through removable caps 130. Boats 125 of the treating material from which the vapor or gas phase is created, when that material is a solid at room temperature, are receivable within these chutes simply by placing same in the chutes and pushing same into that position desired across the width of the tunnel's floor by a pole, not shown, or the like. When the boat 125 is empty it is simply pushed to the opposite side of the chute and out the port provided in the opposite side panel 74 by removing the cap 130. It will be understood that the boats 125 may also be used as liquid containers if the treating material is a liquid at room temperatures. It will also be understood that the treating material, particularly if it is a liquid or gas at room temperatures, may also be introduced into the interior of the tunnel 10 through suitable spray nozzles or the like if desired. Further, it will be understood that instead of manually positioning the boats 125 within the chutes 138 an indexing conveyor, not shown, or the like may be provided to carry the boats into an out of the tunnel 10 from the outside. Also, it will be understood that an air lock arrangement can be used to prevent the escape of vapor when the boats are removed or inserted. It has been found that introduction of small amounts (3 CFM) of dry air will purge the air lock device and prevent fume escape.

The top panel 80 of the treating chamber housing 132 mounts a housing 141 for a drive 142 which powers a paddle fan 143 located centrally between the side panels 74 of the modular unit 14 adjacent the tunnel ceiling 160 as defined by the top panel 80, see FIGS. 8 and 9. Each modular unit 14 contains two such fans 143 positioned substantially symmetrically within the inside of the modular unit 14. Each fan's paddle blades 144 are connnected by a shaft 145 and drive belts 146 with a motor 147. Each motor 147 is mounted on plate 148 fixed between walls 149 of the housing 141. Each drive shaft 145 is carried in bearing blocks 151 mounted on plate 152 which also is fixed between side walls 149 of that housing 141. Each shaft 145 extends through passage 153 in top panel 80 and is centered therein by spacer collar 154. Passage 153 and collar 154 are equipped with suitable packing glands, not shown, to prevent air infiltration and fume escape.

Each fan 143 is adapted to cooperate with a donut shaped recirculation system 156 formed about the axis or periphery of the inside of the modular unit, seen FIG. 9. The recirculation system 156 is provided with two feed-air ducts 157 adjacent the ceiling 160 of the tunnel 10, one feed-air duct extending radially outward from opposite sides of each fan 143 toward the side panels 74 of the modular unit 14, see FIGS. 9 and 10. The feed-air ducts 157 are each of a width that is a little greater than the diameter of the fan 143 itself; each has sides 158, bottom 159 and top (which is the ceiling 160 or inside surface of top panel 80), see FIG. 8. A hole 164 is provided in each feed-air duct's bottom or floor 159 for the fan 143. Ribs 161 on its feed-air duct's floor 159 aid in directing the recirculating treating vapor or gas radially outward from the fans 143, through feed-air ducts 157, to side wall ducts 162 which extend down the inside walls of the side panels 74. The side wall ducts 162 extend the entire length of the treating chamber 14, and each is defined by an inside wall of the heaters 106, the inside wall of side panel 74 and a vertical wall 167 with the top edge of the vertical walls being fixed to ceiling 160 of the tunnel 10 except where the feed-air ducts 157 open thereinto, see the air flow indicated by arrows 155 in FIG. 9. The bottom edge of the vertical walls 167 stop short of, i.e., lie above, the floor 172 of the tunnel 10, see FIG. 9. Resistance heating strips 114 are fixed to the inside wall of the heaters 106, so that the strips 114 are within the side wall ducts 162 and serve to heat the treating vapor or gas as it passes therethrough.

The side wall ducts 162 open into a plenum distribution chamber 171 located beneath the conveyor belt 17, see FIGS. 8 and 9. The plenum distribution chamber 171 is defined by the floor 172 of the tunnel 10 (which is the inside wall of bottom panel 97), and a bottom flat plate 173 having a multiplicity of holes 174 therein, the recirculation flow from side wall ducts 162 being as illustrated by arrows 175 in FIG. 9. The perforated plate 173 extends between the inner walls 167 of side wall ducts 162 from the inlet end to the outlet end of the treating chamber 14, and is seated on angle struts 176 fixed to the walls 167, see FIG. 9. The recirculated atmosphere, as it passes into the plenum distribution chamber 171, is forced to pass over the boats 125 which hold the material to be vaporized when such a technique is used, thereby aiding in the vaporization of that material.

The recirculated vaporous or gaseous treating material then passes up through the holes in the perforated plate 173 and up through the wire mesh conveyor belt into contact with the glass articles to be treated which are supported on the conveyor belt, thereby providing uniform exposure to the glass articles. The circulating treating vapor, after having contacted the glass articles within the treating area 178 inside the treating chamber 14, passes therefrom by exiting through a top flat plate 179 having a multiplicity of holes 182, this plate 179 being coextensive with the bottom plate 173. The top plate 179 extends between the inner walls 167 of the side wall ducts 162 from the inlet end to the outlet end of the treating chamber 14, and is seated on angle struts 183 fixed to the walls 167, see FIG. 9. The top perforated plate 179 is spaced from the ceiling 160 of the tunnel 10 a distance substantially lower than the bottom 159 of feed-air duct 157, thereby defining a return-air duct 184 which cooperates with the fans 143, see FIGS. 8 and 9.

The top perforated plate 179, bottom perforated plate 173 and walls 167 therefor define the treating area 178 through which the upper run 18 of belt 17 passes and within which the glass articles are exposed to the treating vapors or gases. The perforated plates 173, 179 substantially aid in distributing the vapor or gas throughout the entire cross section of the heating environment in an even distribution, thereby insuring adequate and uniform contact of the vapor or gas with the glass articles to be treated as they pass through the treating chamber 14. Once the vapor or gas passes through the top perforated plate 179 it is sucked through the return-air duct 184 by fans 143 and discharged again into feed-air ducts 157 to be recirculated.

Tie strips 191 are mounted above the bottom perforated plate 173 of each treating chamber 14 to support the belt 17 as it passes through the treating area 178, see FIGS. 9 and 10. The tie strips 191 are angulated relative to the axis of the tunnel 10 and are mounted each end between parallel struts 192 that extend the length of the chamber 14. Further, supplementary struts 193 are fixed to the underside of the tie strips 191, and these struts 193 provide further rigidity to the strip 191 geometry. The side struts 192 are held in elevation above the floor 172 of the tunnel 10 by supports 194 mounted to the floor and fixed to the struts 192.

In operation, and as glass articles are carried on the belt 17 through the glass treating tunnel, the air door blowers 49 are activated to provide a heated air curtain at both the inlet end and the outlet end of the tunnel 10. The dead zone heaters are activated to provide a heated environment in the dead zones 13, 13a, 15. The heaters in each of the air door units 12, 16, dead zone units 13, 13a, 15 and treating chambers 14 maintain the desired temperature profile through the tunnel for the treating process which aids in maintaining the treating vapors within the treating chambers 14. Further, the treating chamber fans 143 are activated to provide a continuous, heated circulation of the treating vapor or gas through the treating chambers 14. In addition, the drift controller mechanisms 21 are energized to counteract any vapor or gas drift which may be occurring through the tunnel 10 and causing minor portions of vapor or gas to exit from one end of the tunnel or the other.

Having described in detail the preferred embodiment of the invention, what I desired to claim and protect by Letters Patent is:

1. An open ended treating tunnel through which articles are continuously moved and particularly adapted for contacting those articles with a vapor or gas including
   an inlet air door and an outlet air door, said air doors having an air circulation system which includes a heater adapted to heat the air,
   each of said air doors having a nozzle and an air pickup chamber positioned in opposed alignment with the nozzle, said nozzle and pickup chamber extending substantially across the width of said tunnel,
   article conveyor means passing through said tunnel from said inlet air door to outlet air door,
   an inlet dead zone and an outlet dead zone, said dead zones each desire a heater adapted to heat the environment therein, and said inlet dead zone being positioned adjacent to and downstream in the direction of conveyor travel from said inlet air door and said outlet dead zone being positioned adjacent to and upstream of said outlet air door,
   a treating chamber within which the articles are exposed to the treating vapor or gas, said treating chamber being positioned intermediate said inlet and outlet dead zones, and
   a drift controller positioned within at least one of said inlet and outlet dead zones, said drift controller functioning to counteract vapor or gas drift from said treating chamber to aid in maintaining the treating vapor or gas within said treating chamber,
   said drift controller comprising
      at least one tube disposed substantially transversely to the axis of said tunnel, said tube having at least one line of holes therein substantially parallel to the axis thereof,
      supply piping adapted to interconnect said tube with a compressed gas source, and
      apparatus by which said tube can be rotated about its axis to an angular position adapted to counteract the drift.

2. A treating tunnel as set forth in claim 1 including
   recirculation system associated with said treating chamber, said recirculation system having fan means by which the vapor or gas within said treating system can be recirculated therethrough.

3. A treating tunnel as set forth in claim 1 wherein said inlet and outlet air doors utilize air velocities of between about 100 feet per second and about 300 feet per second.

4. A treating tunnel as set forth in claim 1 wherein said recirculation system comprises a bottom perforate sheet inside said tunnel spaced above the floor of said tunnel, and a top perforate sheet inside said tunnel spaced below the ceiling of said tunnel, said top and bottom sheets extending the length of said treating chamber and said article conveyor means passing therebetween.

5. A treating tunnel as set forth in claim 4 wherein said recirculation system further comprises vertical walls inside said tunnel and spaced from the inside walls of said tunnel, said vertical walls cooperating with said top and bottom perforate sheets to form a recirculation chamber that is donut shaped in cross section when viewed from one end of said treating chamber.

6. A treating tunnel as set forth in claim 1 including at least one chute extending from a side panel on the outside of said tunnel into the interior of said tunnel, said chute being adapted to receive at least one boat of material to be vaporized, and a closure adapted to close said chute and, hence, the inside of said treating chamber, to the environment outside said tunnel.

7. A treating tunnel as set forth in claim 1 wherein said tube is positioned substantially across the width of said tunnel adjacent the ceiling thereof, one end of said tube extending through one side panel of said dead zone and that end carrying an angular indicator with the indicator's pointer being oriented with respect to the line of holes in said tube, thereby permitting the angular position of said tube to be observed and manually changed from outside of said tunnel.

* * * * *